US010298667B2

(12) United States Patent
Cadou

(10) Patent No.: US 10,298,667 B2
(45) Date of Patent: May 21, 2019

(54) METHOD FOR A REMOTE PRESENTATION BETWEEN AT LEAST TWO TERMINALS CONNECTED VIA A NETWORK

(71) Applicant: IMS SOFTWARE SERVICES, LTD., Wilmington, DE (US)

(72) Inventor: Olivier Cadou, Paris (FR)

(73) Assignee: IMS SOFTWARE SERVICES, LTD., Wilmington, DE (US)

( * ) Notice: Subject to any disclaimer, the term of this patent is extended or adjusted under 35 U.S.C. 154(b) by 696 days.

(21) Appl. No.: 14/430,794

(22) PCT Filed: Sep. 24, 2013

(86) PCT No.: PCT/FR2013/052247

§ 371 (c)(1),
(2) Date: Mar. 24, 2015

(87) PCT Pub. No.: WO2014/049262

PCT Pub. Date: Apr. 3, 2014

(65) Prior Publication Data

US 2015/0281341 A1 Oct. 1, 2015

(30) Foreign Application Priority Data

Sep. 25, 2012 (FR) ..................................... 12 58967

(51) Int. Cl.

| | |
|---|---|
| ***G06F 15/16*** | (2006.01) |
| ***H04L 29/08*** | (2006.01) |
| ***H04L 29/06*** | (2006.01) |

(52) U.S. Cl.

CPC ...... *H04L 67/1002* (2013.01); *H04L 65/4084* (2013.01); *H04L 65/605* (2013.01); *H04L 67/02* (2013.01); *H04L 67/42* (2013.01)

(58) Field of Classification Search

CPC ..... H04L 67/1002; H04L 67/42; H04L 67/02; H04L 65/605; H04L 65/4084

(Continued)

(56) References Cited

U.S. PATENT DOCUMENTS 6,240,444 B1 * 5/2001 Fin .................... G06F 17/30873 707/E17.111
6,775,267 B1 * 8/2004 Kung ...................... H04L 12/14 370/352

(Continued)

FOREIGN PATENT DOCUMENTS

EP 002088519 A1 * 2/2008 ............. H04L 12/58
EP 2 088 519 A1 8/2009

(Continued)

OTHER PUBLICATIONS

International Search Report issued in Application No. PCT/FR2013/052247 dated Nov. 28, 2013.

(Continued)

*Primary Examiner* — Douglas B Blair

(74) *Attorney, Agent, or Firm* — John Maldjian; Maldjian Law Group LLC

(57) ABSTRACT

The invention relates to a method for a remote presentation between a first terminal (100) and at least one second terminal (200, 200') connected via a network, including the steps of: generating (20) events during an action of a user on one of the peripherals of the first terminal, and sending said generated events to a machine controller (110) of the first terminal. The invention is essentially characterized by also including the steps of: sending (30) said generated events to a web server (300); and sending (40) said events from said web server (300) to at least one machine controller among the machine controller (210) of said second terminal (200) and the machine controller (410) of a video server (400), the (Continued)

configuration of which is compatible with that of the first terminal (100).

9 Claims, 3 Drawing Sheets

(58) Field of Classification Search
USPC .................................................. 709/203, 204
See application file for complete search history.

(56) References Cited

U.S. PATENT DOCUMENTS

| | | | | |
|---|---|---|---|---|
| 8,903,905 | B2 * | 12/2014 | Cadou | H04L 12/1831 709/204 |
| 8,996,240 | B2 * | 3/2015 | Plante | G06F 9/4443 340/539.16 |
| 2002/0029245 | A1 | 3/2002 | Nahon | |
| 2003/0106813 | A1 | 6/2003 | Seaward | |
| 2004/0225716 | A1 * | 11/2004 | Shamir | G06F 17/30873 709/204 |
| 2005/0246422 | A1 | 11/2005 | Laning | |
| 2006/0098086 | A1 * | 5/2006 | Chandra | H04N 7/15 348/14.07 |
| 2006/0167997 | A1 * | 7/2006 | Forstadius | G06F 17/30194 709/204 |
| 2007/0245391 | A1 * | 10/2007 | Pont | H04N 7/17318 725/113 |
| 2008/0005233 | A1 | 1/2008 | Cai et al. | |
| 2008/0114953 | A1 * | 5/2008 | Takatsuka | G11B 27/034 711/162 |
| 2009/0183087 | A1 * | 7/2009 | Robins | G06F 3/0481 715/751 |
| 2010/0081116 | A1 * | 4/2010 | Barasch | A63B 24/0003 434/252 |
| 2011/0185390 | A1 * | 7/2011 | Faenger | G01C 21/3688 725/75 |
| 2011/0276619 | A1 * | 11/2011 | Khan | H04L 67/141 709/203 |
| 2012/0133727 | A1 * | 5/2012 | Bolduc | H04L 12/1827 348/14.07 |
| 2012/0158527 | A1 * | 6/2012 | Cannelongo | G06Q 30/02 705/14.73 |
| 2012/0317487 | A1 * | 12/2012 | Lieb | G06F 17/30873 715/730 |
| 2013/0101115 | A1 * | 4/2013 | Khamkhosy | H04N 5/222 380/201 |
| 2013/0262686 | A1 * | 10/2013 | Hill | H04L 65/1069 709/228 |
| 2013/0307785 | A1 * | 11/2013 | Matsunaga | G08C 17/02 345/169 |
| 2014/0293046 | A1 * | 10/2014 | Ni | H04N 7/181 348/143 |
| 2015/0046533 | A1 * | 2/2015 | Talloen | H04M 3/567 709/204 |
| 2017/0118258 | A1 * | 4/2017 | Lieb | G06F 9/452 |
| 2017/0300286 | A1 * | 10/2017 | Lieb | H04L 65/4015 |

FOREIGN PATENT DOCUMENTS

| | | |
|---|---|---|
| JP | H05-257904 | 10/1993 |
| JP | H10-126773 | 5/1998 |
| JP | H10-283293 | 10/1998 |
| JP | 2004-78914 | 3/2004 |
| JP | 2004-178268 | 6/2004 |
| JP | 2009-541901 | 11/2009 |
| WO | 2002/023324 A1 | 3/2002 |

OTHER PUBLICATIONS

Written Opinion issued in Application No. PCT/FR2013/052247 dated Nov. 28, 2013.

* cited by examiner

METHOD FOR A REMOTE PRESENTATION BETWEEN AT LEAST TWO TERMINALS CONNECTED VIA A NETWORK

The present invention relates to the field of sharing documents or applications between two terminals connected via a network.

Document is taken to mean any type of information, whatever its representation, including graphic, associated with any type of computer file format.

Application is taken to mean software, whatever its version, which can be executed natively by the terminal on which said software is installed or a web application that can be executed by a server to which the terminal is connected (SaaS mode solution: Software as a Service).

Terminal is taken to mean any type of communicating object capable of communicating with a server, for example a smartphone, or a personal computer or PC, indiscriminately of its operating system, whether said system is developed by Microsoft (registered trademark), Apple (registered trademark) or is free software, for example Linux (registered trademark). The terminal may come in fixed form (with central unit), portable form or as a graphic touch tablet, for example an iPad (registered trademark).

Several types of solutions exist for sharing documents or applications, for example for making presentations, potentially interactive, remotely between two terminals connected via a network, for example the Internet.

By convention, transmitter is taken to mean the terminal that transmits documents to one or more receiving terminals, in the case in point via a web server. The transmitter may for example be associated with a presenter who wishes to share, present documents or applications to participants.

A first type of sharing of documents or applications between two terminals consists in sharing all or part of a display screen.

In this case, typically, an application installed on a first transmitter terminal, captures all or part (for example a display window) of the content of its display screen and sends it in the form of a video stream to a server which then retransmits said steam to a second receiver terminal, which is equipped with a suitable reader for reading this type of video stream.

In this case, a same application must be installed on the terminal of each participant wishing to share all or part of his display screen.

The advantage of this type of solution resides in that it is no longer restricted by problems of format of the information or documents exchanged or the applications used. The document or the application to be shared does not need to be existing on the receiving terminals, they can exist only on the transmitting terminal. Whatever the documents or applications used by the presenter, the participants can see them displayed on their screens whatever their hardware or software configuration.

However, this type of solution requires the installation of an application on each transmitting or receiving terminal.

Moreover, through the use of video stream, this type of solution requires an important bandwidth (upstream and downstream) and efficient terminals.

A second type of sharing of documents or applications between two terminals consists in taking control remotely of a terminal.

In this case, typically, as previously, an application installed on a first transmitter terminal captures the content of all or part of its display screen and sends this content in the form of a video stream to a server which then retransmits said video stream to a second receiving terminal, which is equipped with a suitable reader to read this type of video stream.

Moreover, an application installed on the second terminal communicates with the first terminal via a server in order to control the peripherals (mouse and keyboard) of the first terminal.

In this case, for example, a presenter associated with the second terminal can take control of the first terminal, associated with a participant.

The advantage of this type of solution resides in that it is also not restricted by problems of format of documents exchanged and applications used. Whatever the documents or applications used by the presenter, the participants can see them on their screens, whatever their software or hardware configuration.

However, this type of solution requires the installation of an application on each terminal.

Moreover, this type of solution requires an important bandwidth (upstream and downstream) and efficient terminals.

Moreover, the documents or applications presented must be present on the first terminal (on which control is taken).

A third type of sharing of documents between two terminals consists in presenting documents by refresh display command.

In this case, typically, the terminals connect on a common server which disseminates to them the same documents simultaneously through the intermediary of an automatic refresh system present on the first connection page. The choice of the documents being commanded by one of the terminals.

The advantage of this type of solution resides in its simplicity in that it does not require the installation of a particular application on all of the terminals, typically an internet browser may suffice.

However, this type of solution depends on the software or hardware configuration of the terminals of the users for reading the documents sent.

Moreover, this type of solution generally requires an important bandwidth (downstream from the common server).

Moreover, this type of solution does not make it possible to share applications between terminals.

In fact, these three types of solutions are quite well adapted to dedicated organisations, for example intra-company, but prove to be very restrictive, or even impossible to implement for example within the context of roaming users or service provision, especially due to the fact:

- that it is, in a good many situations, impossible to install the least application on the terminals of the participants/receivers (whereas an installation is often possible on the presenter/transmitter side);
- that it is very often impossible to prepare multiple versions of the documents to be presented to adapt to different possible software or hardware configurations of the participants; and
- that the presenter or the participants sometimes have available a very poor bandwidth.

The present invention aims to overcome one at least of these difficulties and proposes a novel type of solution.

According to a first of its aims, the invention relates to a method for a remote presentation between a first terminal (100) and at least one second terminal (200, 200') connected via a network, including the steps of:

generating (20) events during an action of a user on one of the peripherals of the first terminal, and sending said generated events to a machine controller (110) of the first terminal.

The invention is essentially characterised in that it further comprises the steps of:

sending (30) to a web server (300) said generated events; and sending (40) said events from said web server (300) to at least one machine controller among the machine controller (210) of said second terminal (200) and the machine controller (410) of a video server (400) the configuration of which is compatible with that of the first terminal (100).

In an embodiment, also provided are the steps of:

comparing (70) the configuration of the first terminal (100) and that of the second terminal (210, 210'); and according to the result of the comparison, if the configurations are similar, translating (80) said events before sending them to a machine controller of the second terminal;

if the configurations are not compatible, transmitting (88) an error message or an alert message.

It may be provided, if the configurations are identical or similar, to send the events to a machine controller of the second terminal, potentially without translation. The sending of said events is preferably done via a web server.

In an embodiment, provision is made moreover, on the video server (400), for the steps of:

generating and recording (50) a video stream reproducing the actions of a user on one of the peripherals of the first terminal by the events generated (20) and sent (30, 40).

Provision may be made for, if the configurations are not compatible, transmitting (88) an error message or an alert message; and if the configurations are similar, translating (80) said events before sending them to a machine controller of the video server;

generating on the video server and recording on this same server (50) a video stream from events played by the machine controller of the video server, reproducing the actions of a user on one of the peripherals of the first terminal by the events generated (20) and received from the web server (30, 40).

In an embodiment, a step of disseminating (60) said video stream to said second terminal (200, 210') is also provided.

In an embodiment, also provided is a step of:

synchronising (10) the first terminal and the second terminal by opening in their respective browsers a same web page (URL) or opening a same application.

Thanks to this characteristic, the first terminal and the second terminal are in a similar initial situation before starting the remote sharing.

In an embodiment, it is provided that at least one of the first and second terminals comprises a browser configured to read HTML5 data format.

In an embodiment, also provided on one at least of said first terminal and second terminal, is at least one of the steps of:

downloading (90) a document in real time, downloading (91) a document prior to the step of sending said events from said server to at least one machine controller among the machine controller of said second terminal and the machine controller of a video server, and downloading (92) a document by dissemination in continuous mode.

In an embodiment, it is provided that the step of translation (80) comprises for a given terminal at least one of the steps of:

transforming (81) the coordinates of a pointer into coordinates relating to the dimension of the screen associated with said terminal; and establishing (82) a bijective correspondence between the actions of a user on a touch screen and similar actions on a non-touch screen.

In an embodiment, also provided are the steps of:

sending (31) to said web server the identity of the application launched by the action of a user on the first terminal or one of its peripherals;

sending (32) the identity of said application from said web server to at least one machine controller of said second terminal; and forcing (33) the execution of said application on said second terminal.

According to another of its aims, the invention relates to a computer programme, including programme code instructions for the execution of the steps of the method according to the invention, when said programme is executed on a computer.

The invention may be applied especially to collaborative work on a web content or within an application shared between users equipped with graphic tablets such as iPad (registered trademark), within the scope for example of remote training, including for virtual classes.

Other characteristics and advantages of the present invention will become clearer on reading the following description given for illustrative purposes and non-limiting and made with reference to the appended figures, among which:

Figure 1:
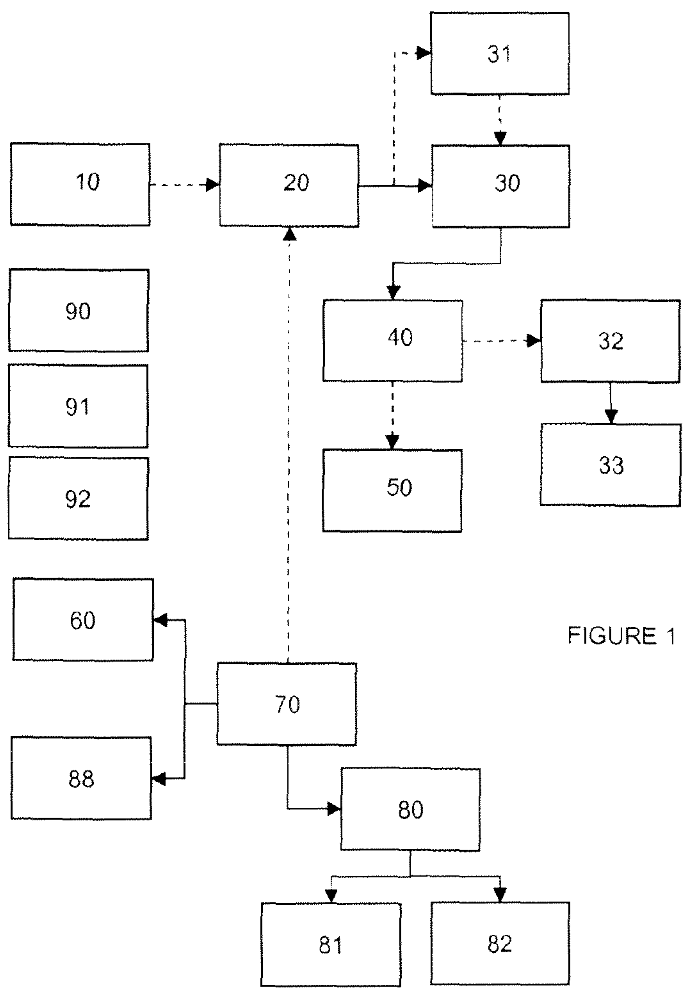
FIG. 1 illustrates an embodiment of the method according to the invention.

Every terminal 100, 200, 200' comprises one or in general more peripherals 120, 130, 220, 230, 220', 230', connected to the computer system of said terminal.

It may be an input peripheral, for example a keyboard or a pointing device such as a mouse or a graphic tablet with a stylus; output peripheral such as a visualisation screen; or input/output peripheral such as a touch screen.

Each peripheral is in general connected to a respective individual controller. Such that each terminal generally comprises at least two separate controllers: a machine controller and a peripheral controller (common to all of the peripherals or one controller per peripheral).

When a user exercises one or more physical actions (sequential or simultaneous) on one of the peripherals of a terminal, the controller of the peripheral used sends to a controller of the terminal, designated machine controller, a corresponding set of instructions called events. On receiving these events, the machine controller transforms them into computer actions, that is to say into machine commands, potentially to another peripheral.

For example, without a particular application being necessarily launched, a physical action consisting in making a click (right or left) on a hypertext link, on a button, on an icon . . . , in moving one or two pointers (for example a mouse, or one or two fingers on a touch screen), etc. leads to the generation 20 of corresponding events for which there results by the machine controller an associated command (computer action): the opening of a new page (web or other) on the screen, the launch of an application that is to say the execution of a software, making a zoom, a rotation, etc.

The events sent to the machine controller comprise for example indications on the position of the pointer(s), its/their potential movement (distance and rate of movement or distancing), as well as the potential action (click, double click, touch, drag, etc.).

The machine controller 110, 210, 210' transforms these indications into instructions, typically to a controller of another, or even the same, peripheral.

For convenience of language, event is taken to mean indiscriminately the indications sent to the machine controller from a peripheral controller or the instructions sent from the machine controller to a peripheral controller.

When a particular application is launched, it is conventional that each application uses a specific application controller, which makes it possible according to the same principle of executing a certain number of specific functions, depending on the physical action of a user in this application.

For example, in an application enabling the entry of text, when a user presses on the letter "A" of his keyboard, the machine controller receives from the controller of the keyboard or of the touch screen an event signifying that this letter A is selected, and transmits to the controller of the screen (touch screen or not) an order to display this character A.

What is proposed here is a shrewd use of the events and at least one machine controller of at least one of the two terminals in a network, in which in an embodiment, the machine controller of one of the two terminals is driven by the events generated by the other of the two terminals.

In another embodiment, alternative or combinatory, the machine controller of the transmitter terminal of one of the two terminals transmits events to a video server which transforms these instructions into a video stream to the other of the two terminals or to several other terminals (receivers). The machine controller of the second terminal (receiver) can, in return, even in reception of a video stream, transmit events to control the first terminal (transmitter).

Thanks to the invention, it is possible to drive the application controller of one of the two terminals directly by the other of the two terminals via a web server.

Different embodiments are described in greater detail hereafter.

A method is provided for a remote presentation between a first terminal 100 and at least one second terminal 200, 200' connected via a network, typically the Internet.

Each terminal can act in transmission mode (sending events to a web server 300) or in reception mode (receiving events from the web server).

A step 30 is provided consisting in sending to a web server 300 (typically to its machine controller 310) the events generated by an action of a user on the first terminal or one of its peripherals.

Thanks to this characteristic, the bandwidth between the first terminal and the web server may be very limited in comparison especially with the sending of the content in the form of a video stream. In fact, each event sent represents typically several tens of octets. The step of sending 30 may thus be very rapid.

Preferably, the sending is carried out through the intermediary of a specific application launched by a user of said first terminal.

Once the events received by the web server 300, a step 40 is provided consisting in sending said events from said web server to at least one machine controller 210 of said second terminal 200. It may be provided as a complement or as a replacement that the step 40 consists in sending said events from said web server 300 to at least one machine controller 410 of a video server 400.

The machine controller 210 of said second terminal 200 receives the events from the web server 300 to which it is connected preferably through the intermediary of a specific application launched by a user of said second terminal. The machine controller 210 then interprets the events as if they come from said user of said second terminal using its interface and transforms them into computer action, which reproduces on the second terminal 200 the actions of the user of the first terminal 100.

In the same way as previously, since only events are transmitted, the bandwidth between the web server 300 and the second terminal 210 or the video server 400 may be very low.

This configuration is particularly suited to cases where the first terminal and the second terminal have identical or similar configurations, that is to say compatible configurations. Any action carried out on one of the terminals is reproduced in an identical manner on the other terminal.

"Configuration" is taken to mean at least one of the elements among the operating system, the size of the screen, the resolution of the screen, and the version of the software or the browser.

"Similar configuration" is taken to mean especially that the first and the second terminal each comprise a respective version of a same software but that these two versions are compatible with each other, that is to say that an action relating to this software on one of the terminals leads to the same action relating to this software on the other terminal.

Since all the terminals do not necessarily have identical or similar configurations, a step 70 may be provided consisting in comparing the configuration of the first terminal and that of the second terminal.

Typically, this amounts to identifying for example if the terminals connected to the network are touch screens or not, the dimension of their screen, their software versions, etc.

Thus, according to the result of the comparison:

- if the configurations are identical said events are sent to a machine controller of the second terminal;
- if the configurations are similar, it may be provided to translate 80 said events before sending them to a machine controller of the second terminal; and
- if the configurations are not compatible, provision may be made to transmit an error message or an alert message, inviting for example implementation of the solution with the video server described hereafter.

The step of translation 80 is implemented preferably by the web server 300 equipped with translation means 340, including typically a memory and a calculator. Alternatively, the step of translation 80 may be delocalised, the translation means 340 being comprised by another machine, server or terminal. The step of translation 80 comprises for a given terminal at least one of the steps of:

- transforming 81 the absolute coordinates of a pointer into coordinates relating to the dimension of the screen associated with said terminal; and
- establishing 82 a bijective correspondence between the actions of a user on a touch screen and similar actions on a non-touch screen.

For example, when a user points using a pointer (mouse, stylus, finger), the absolute coordinates (X pixel, Y pixel of the screen) of the pointed spot are transformed into relative coordinates (Xr %, Yr % of the screen dimension).

Said relative coordinates are sent to the other terminal of which the machine controller may then command the execution so that the same percentage is applied, which is particularly advantageous when the first and the second terminals have different respective screen dimensions.

For example, by taking as origin the upper left hand corner of the screen, if the user of the first terminal clicks on the icon situated for example at 10% of the width of the screen and at 20% of the height of the screen with respect to the origin; a click or equivalent (see below) is carried out on the second terminal with the same percentage with respect to the dimension of the screen of the second terminal. Thus, if the two icons situated at these respective places correspond to the same application, this application launched on the first terminal is also launched on the second terminal.

Similarly, it is possible to establish a correspondence, preferably bijective, for example in the form of a correspondence table recorded on the web server, between the actions of a user on a touch screen and the corresponding actions on a non-touch screen. For example, on a terminal with a touch screen, the reception of an event corresponding to a touch of a finger, to a modification of the distance between two fingers, to a finger drag, etc. generates on a terminal with a non-touch screen an event corresponding respectively to a click, a zoom of which the proportion depends on the spacing between two fingers, and a passage to a following/preceding page according to the direction of movement of the finger drag, etc.

In certain cases, the events sent to the web server also comprise the identity 31 of the application launched (executed) by the action of a user on the first terminal or one of its peripherals. The identity of said application is then sent from the web server to at least one machine controller of said second terminal, which enables the execution, potentially forced 33, of said application on said second terminal.

Furthermore, it may be provided to synchronise 10 beforehand the first terminal and the second terminal. To this end, provision is made preferably to synchronise them by opening in their respective browsers a same web page (URL). Browser is taken to mean an Internet web or social network browser (Facebook—registered trademark—for example).

Such a configuration is advantageous in web presentations. In particular, it may be provided that at least one of the first and second terminals comprises a browser configured to read HTML5 data format.

In this case, the step of translation is optional. It is only necessary from/to a terminal that comprises a browser configured to read previous HTML5 data format, in the case in point HTML4.

Examples of Operation.

In cases where the configurations of the first and the second terminals are identical, the actions of a user of the first terminal are reproduced in an identical manner on the second terminal.

In cases where the configurations of the first and the second terminals are compatible, the web server translates the actions of a user of the first terminal so that they are reproduced in an identical manner on the second terminal.

For example, a user of the first terminal, in the case in point an iPad (registered trademark), wishes to share a document with a user of a second terminal, in the case in point a PC with a mouse. On their connection to the web server, said server calculates their configuration and considers that they are compatible. For example, the first user is a presenter who uses on his iPad an application that encapsulates a web browser (typically Webkit). He wishes to share a HTML5 document remotely with a second user, using a PC.

The second user connects with his web browser (for example Chrome) onto a site, the URL address of which is communicated to him by the presenter.

The browser of the second user sends to the web server the information items concerning its configuration (via the agents) and especially the identity of the browser used (in the case in point Chrome, a browser that knows how to interpret HTML5 events) and the resolution of this screen.

Consequently, the presenter can share a HTML5 document, any event on his terminal is translated and reproduced on the second terminal.

For example, a finger drag on the touch screen of the first terminal is transformed, thanks to the correspondence table, into an event of movement of the mouse on the second terminal. Similarly, a finger touch on the touch screen of the first terminal is transformed, thanks to the correspondence table, into a click event on the second terminal.

It may be provided to synchronise the two terminals on a same application, for example a browser, which is advantageous for example in the case where the arrangement of the icons is not the same on the two terminals. The browsers may be different, they do not need to be identical. The browsers comprise the same language. For example, the latest versions of Chrome, Safari, Opera, Firefox and Internet Explorer comprise HTML5 and its Javascript.

The dialogue between the machine controller and the application controller of the first terminal is then translated into dialogue between the machine controller and the application controller of the second terminal, which guarantees that the actions of the user of the first terminal are reproduced on the second terminal.

In cases where the configurations of the first and the second terminals are not compatible, it is possible to provide a video server, in addition to the second terminal.

The video server is equipped with a configuration compatible with the first terminal and equipped with video capture software making it possible by video means 450 to generate and record 50 a video stream reproducing the actions of a user on one of the peripherals of the first terminal, thanks to the events generated and sent. Said video stream may then be disseminated 60 to a second terminal 200, 200', in particular a second terminal 210' the configuration of which is not compatible with that of the first terminal.

The video server 400 can operate in the sense of the second terminal as described previously or emulate its operation.

It is provided to record a video stream of the actions corresponding to the events generated by the actions of a user on the first terminal or one of its peripherals.

To this end, the events sent by the first terminal to the video server (machine controller) generate the execution of orders by said server reproducing the actions of the user of the first terminal, said orders are captured in the form of a video stream transmitted to the second terminal.

This configuration has the advantage of only requiring a very small upstream bandwidth between the first terminal and the video server; and any software/hardware configuration of the second terminal. It is thus possible to overcome problems of format of documents exchanged. Whatever the documents or software used for example by a presenter on a terminal, participants on other terminals can see these on their screens, whatever their configuration.

For the presentation of a same document between two terminals, it is possible to further provide on one at least of said first terminal and second terminal, at least one of the steps of:

downloading 90 a document in real time, downloading 91 a document prior to the step of sending said events from said server to at least one machine controller among the machine controller of said second terminal and the machine controller of a video server, and downloading 92 a document by dissemination in continuous mode.

In particular, it may be provided that the dissemination in continuous mode is carried out in the cache memory of the receiving terminal.

Prior downloading is advantageous for example in a roaming configuration.

The present invention is not limited to the embodiments described previously. For example, it is possible to combine the technically compatible embodiments described previously, an embodiment of which is illustrated in FIG. 2.

Figure 2:
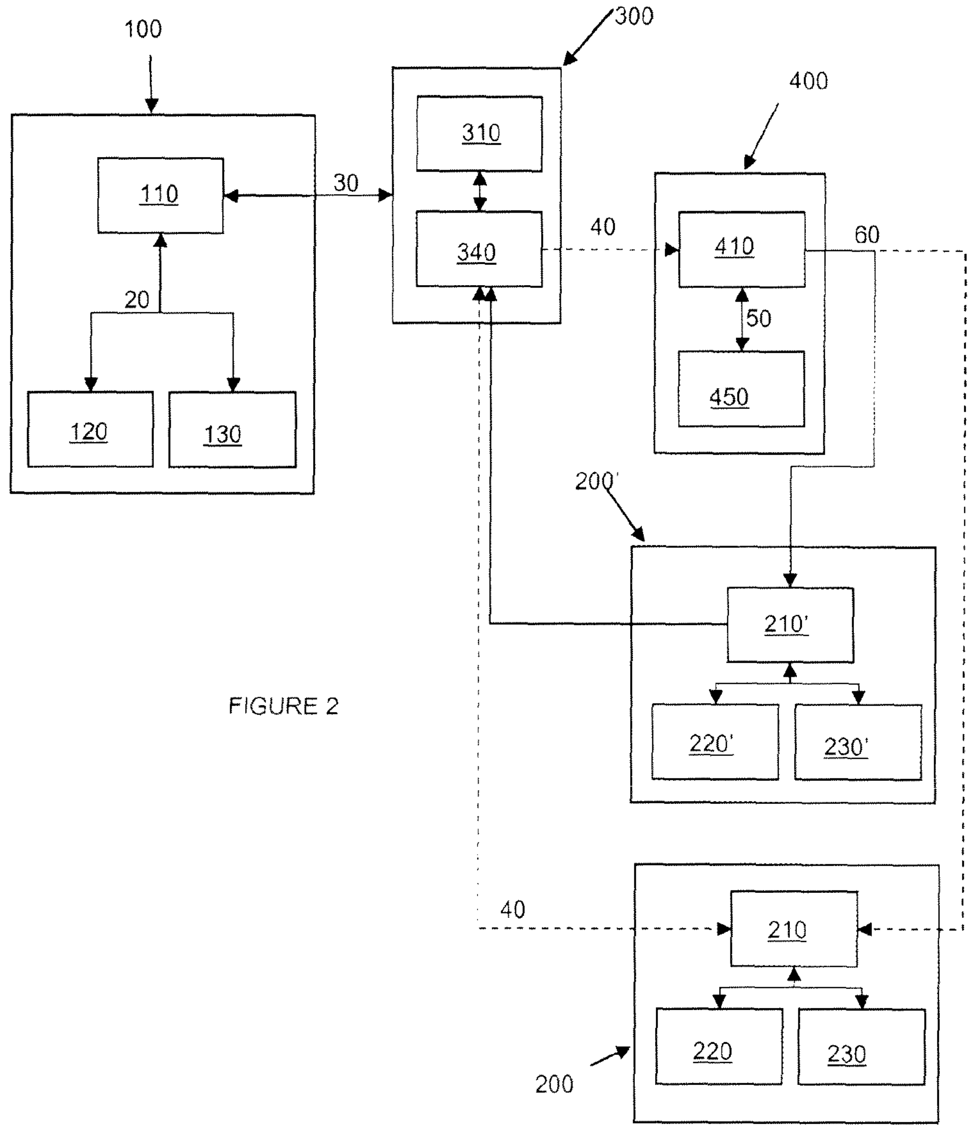
FIG. 2 illustrates an embodiment of a system capable of implementing the method according to the invention.
Figure 3:
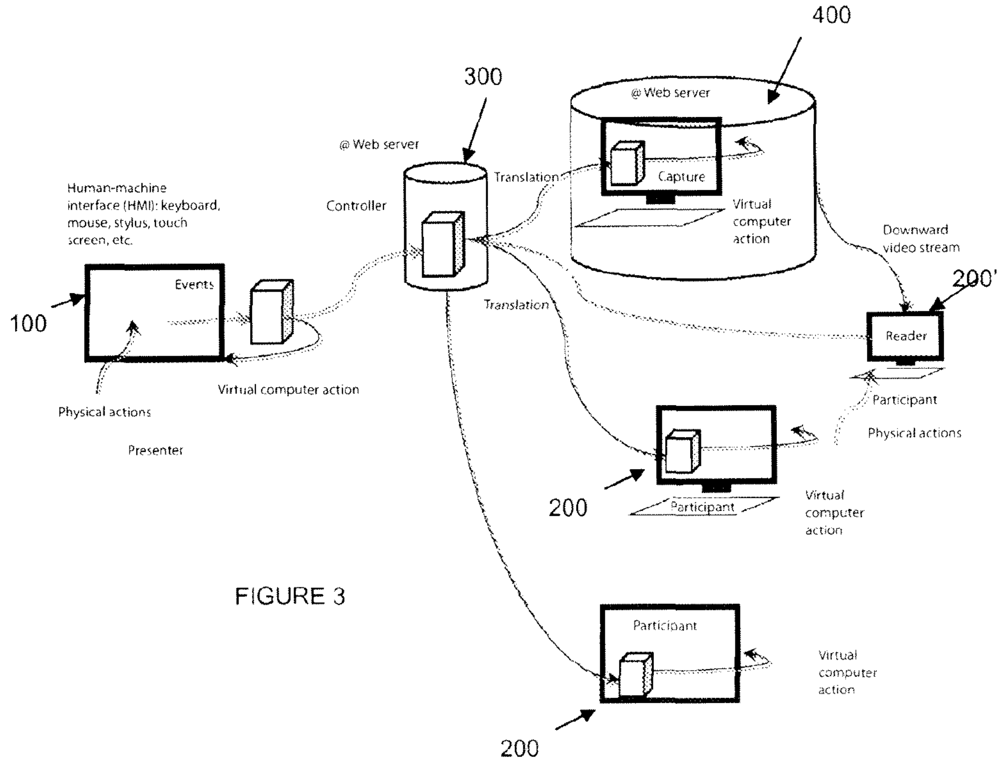
FIG. 3 illustrates an embodiment of a system capable of implementing the method according to the invention.

In FIG. 2, the direction of the arrows relate to the possible direction of communication, the steps of the method are represented by their numerical reference, and the dotted lines, as for FIG. 1, are synonymous with an optional character.

The notion of first and second terminal is relative:

each terminal may be considered as first or second according to the context of use, and preferably each terminal may be capable of transmitting and receiving events.

For example, in the case where a participant on a second terminal does not have available a configuration that is initially compatible with that of a presenter on a first terminal, the second terminal receives a video stream from the video server, on which the participant can interact by sending back events which are potentially translated by the web server and sent to the first terminal, and potential other participants.

Obviously, the invention is not limited to two terminals but may comprise a plurality of network connected terminals. In particular, when the receiving terminals are compatible with the transmitting terminal and that a video server is not necessary, since only events are exchanged via the web server, the bandwidth required is very small and it is possible to connect several hundred to several thousand terminals, which is particularly advantageous for on-line training.

The invention claimed is:

1. A method for reproducing a presentation formed on a first terminal of a plurality of terminals on a second terminal of the plurality of terminals connected to each other via a network, each of the plurality of terminals including a configuration identifying peripherals, software applications, and their versions, the method comprising steps of:

generating, on the first terminal, one or more events responsive to a plurality of actions of a user on the peripherals of the first terminal, the plurality of actions controlling one or more of the software applications;

providing a first computing device having a first processor connected to a first memory storing first instructions and to the network and having access to the configuration of each of the plurality of terminals; and comparing, when the first instructions are executed on the first processor, the configurations of the first and second terminals, wherein when the compared configurations are identical, reproducing, on the second terminal, the generated one or more events and respective software applications;

wherein when the compared configurations are compatible but not identical, transforming, on the first processor, the one or more events to be compatible with the versions of the respective software applications on the second terminal, and reproducing, on the second terminal, the transformed one or more events and respective software applications; and wherein when the compared configurations are not compatible, providing a second computing device having a second processor connected to a second memory storing second instructions and to the network, and including peripherals and software applications present on the first and second terminals, and reproducing, when the second instructions are executed on the second processor, the generated one or more events using the software applications with versions present on the second terminal and recording a video stream, of said reproduced generated one or more events, and displaying, on the second terminal, the recorded video stream.

2. The method of claim 1, further comprising steps of: when the configurations are not compatible, transmitting an error message and/or an alert message.

3. The method of claim 1, further comprising a step of disseminating said video stream to said second terminal.

4. The method of claim 1, further comprising a step of: synchronizing the first terminal and the second terminal by opening in their respective browsers a same web page (URL) or opening a same software application.

5. The method of claim 4, wherein the first and second terminals each comprises a browser configured to use HTML5 data format.

6. The method of claim 1, further comprising the steps of:

downloading a document comprising the generated one or more events on the first processor in real time, downloading the document on said second terminal and the second terminal, and downloading the document by dissemination in continuous mode.

7. The method of claim 1, wherein the step of transforming further comprises the steps of:

transforming the coordinates of a pointer into coordinates relating to the dimension of a screen associated with the first terminal; and establishing a bijective correspondence between the actions of the user on a touch screen of the first terminal and corresponding actions on a non-touch screen of the second terminal.

8. The method of claim 7, further comprising the steps of:

receiving an identity of the software application launched by the action of the user on the first terminal;

sending the identity of said application to the second terminal; and initiating execution of said software application on said second terminal.

9. A system for reproducing a presentation formed on a first of a plurality of terminals connected to each other via a network on a second of the plurality of terminals, each of the plurality of terminals including a configuration that identifies peripherals, software applications, and their versions, the system comprising:

the first terminal, wherein the first terminal generates one or more events responsive to a plurality of actions of a user on the peripherals of the first terminal, the plurality of actions controlling one or more of the software applications;

a first computing device having a first processor connected to a first memory storing first instructions and to the network and having access to the configurations of each of the plurality of terminals, the first processor, when the first instructions are executed, compares the configurations of the first and second terminals;

wherein when the compared configurations are identical, the second terminal reproduces the generated one or more events and respective software applications;

wherein when the compared configurations are compatible but not identical, the first processor transforms the one or more events to be compatible with the versions of the respective software applications on the second terminal, and the second terminal reproduces the transformed one or more events and respective software applications; and wherein when the compared configurations are not compatible, a second computing device having a second processor connected to a second memory storing second instructions and to the network and including peripherals and software applications present on the first and second terminals, and reproduces, when the second instructions are executed on the second processor, the generated one or more events using the software applications with versions present on the second terminal and recording a video stream of said reproduced generated one or more events, and the second terminal displays the recorded video stream.

* * * * *